(12) United States Patent
Kim et al.

(10) Patent No.: US 9,562,578 B2
(45) Date of Patent: Feb. 7, 2017

(54) BRAKE DISC MANUFACTURED FROM HETEROGENEOUS MATERIALS AND METHOD OF MANUFACTURING THE SAME

(71) Applicants: Hyundai Motor Company, Seoul (KR); Kia Motors Corporation, Seoul (KR); Seohan Industry Co., Ltd., Chungcheongbuk-do (KR)

(72) Inventors: Yoon-Cheol Kim, Kyounggi-Do (KR); Jai-Min Han, Kyounggi-Do (KR); Seong-Jin Kim, Kyounggi-Do (KR); Jae-Young Lee, Kyounggi-Do (KR); Kyoung-Don Lee, Daegu (KR)

(73) Assignees: Hyundai Motor Company, Seoul (KR); Kia Motors Corporation, Seoul (KR); Seohan Industry Co., Ltd., Choongchungbok-do (KR)

( * ) Notice: Subject to any disclaimer, the term of this patent is extended or adjusted under 35 U.S.C. 154(b) by 64 days.

(21) Appl. No.: 14/556,436

(22) Filed: Dec. 1, 2014

(65) Prior Publication Data
US 2015/0184712 A1    Jul. 2, 2015

(30) Foreign Application Priority Data
Dec. 31, 2013  (KR) .......................... 10-2013-169205

(51) Int. Cl.
| B22D 19/00 | (2006.01) |
| B22D 19/16 | (2006.01) |
| F16D 65/12 | (2006.01) |
| B22D 17/00 | (2006.01) |
| F16D 65/02 | (2006.01) |

(52) U.S. Cl.
CPC ............ *F16D 65/125* (2013.01); *B22D 17/00* (2013.01); *B22D 19/0081* (2013.01); *B22D 19/16* (2013.01); *F16D 65/123* (2013.01); *F16D 2065/134* (2013.01); *F16D 2065/1316* (2013.01); *F16D 2200/003* (2013.01); *F16D 2200/0013* (2013.01)

(58) Field of Classification Search
CPC ... B22D 19/0081; B22D 19/16; F16D 65/123; F16D 65/125
USPC ..................................... 164/94, 95, 103, 112
See application file for complete search history.

(56) References Cited

U.S. PATENT DOCUMENTS

| 3,760,863 A * | 9/1973 | Weyersberg ........... B22D 19/08 164/127 |
| 3,820,588 A * | 6/1974 | Funke .................... B22D 13/04 164/288 |

FOREIGN PATENT DOCUMENTS

| DE | 10 2009 002 690 A1 | 11/2010 |
| JP | 9-504739 | 5/1997 |
| JP | 2004-526906 A | 9/2004 |
| JP | 2008-518175 A | 5/2008 |
| JP | 2012-503146 A | 2/2012 |
| KR | 10-2013-17376 | 2/2013 |
| KR | 10-2013-0064304 A | 6/2013 |

* cited by examiner

*Primary Examiner* — Kevin P Kerns
(74) *Attorney, Agent, or Firm* — Mintz Levin Cohn Ferris Glovsky and Popeo, P.C.; Peter F. Corless (57) ABSTRACT

Disclosed are a brake disc manufactured from heterogeneous materials and a method of manufacturing the brake disc. In particular, the brake disc manufactured from heterogeneous materials, in which the number of bridges may be optimized to improve castability and relieve stress, thereby eliminating occurrence of a crack and the like which may be generated due to a difference in a thermal expansion coefficient between a friction part and a hat part.

5 Claims, 8 Drawing Sheets

BRAKE DISC MANUFACTURED FROM HETEROGENEOUS MATERIALS AND METHOD OF MANUFACTURING THE SAME

CROSS-REFERENCE TO RELATED APPLICATIONS

This application claims priority under 35 U.S.C. §119 to Korean Patent Application No. 10-2013-169205, filed on Dec. 31, 2013, in the Korean Intellectual Property Office, the disclosure of which is incorporated herein by reference in its entirety.

TECHNICAL FIELD

The present invention relates to a brake disc. In particular, the brake disc may be formed by coupling a friction part with a hat part, which are manufactured from heterogeneous or different materials, thereby improving durability of the brake disc. Also provided is a method of manufacturing the brake disc manufactured from heterogeneous materials.

BACKGROUND

In general, a brake disc of a vehicle refers to a device used for decelerating or stopping the vehicle, and configures an essential braking system of the vehicle. The brake disc used in the braking system converts kinetic energy of the vehicle to heat energy and the like by using frictional force generated through friction with a friction material to stop or decelerating the vehicle.

In a brake disc in the related art, all of a hat part mounted to a hub and a friction part rubbed during braking are manufactured from a single material such as gray cast iron having a flake graphite structure to exhibit excellent braking characteristics, such as vibration damping performance, a damping property, a heat radiating property, and a lubricating function.

Recently, vehicle industries have devoted to development of technologies for improving fuel efficiency in accordance with depletion of petroleum energy, a climatic change issue and an increase in greenhouse gas. Among those efforts, a technology for reducing a weight of a vehicle without deteriorating the performance of the vehicle has been focused for improving fuel efficiency.

Particularly, reducing in weight in a lower part of the vehicle may directly influence performance and fuel efficiency of the vehicle, and a decrease in unstrung mass, which is directly related to a wheel driving load, may be efficient to improve fuel efficiency.

For example, in order to reduce the weight of the brake disc in the lower part of the vehicle, a brake disc manufactured from heterogeneous materials, in which the friction part adopts gray cast iron and the hat part adopts aluminum, has been developed.

Figure 1:
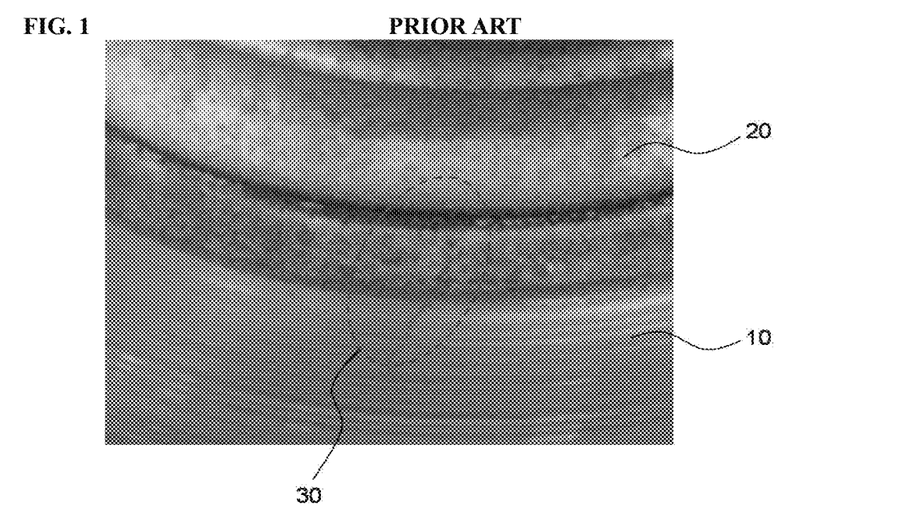
FIG. 1 is a photographic view showing a test result of a brake disc made of heterogeneous materials in the related art after an experiment under a severe condition.

However, when the brake disc made of the heterogeneous materials has a condition in which a braking speed and a braking load are severe, such as in the case where a temperature of a friction surface is increased to about 800° C., a crack 30 may be generated in the friction part due to a difference in a thermal expansion coefficient between a friction part 10 made of gray cast iron and a hat part 20 made of an aluminum alloy (FIG. 1).

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a brake disc manufactured from heterogeneous materials, in which a number of bridges N may be optimized to improve castability and relieve stress. Therefore, the problems as described above, such as a crack generated due to a difference in a thermal expansion coefficient between a friction part and a hat part, may be eliminated. The method of manufacturing the brake disc is also provided.

In an exemplary embodiment, a brake disc manufactured from heterogeneous materials may include: a gray cast iron friction part, which includes a coupling hole at a center thereof, is shaped like a disc, and is in contact with a pad to generate braking force; and an aluminum hat part coupled to one surface of the gray cast iron friction part. In particular, the friction part may include a plurality of bridges which are positioned at a predetermined interval and formed from an internal surface of the friction part toward the coupling hole, and have a protruding shape. In certain exemplary embodiments, the number of bridges N may be determined according to an Equation below.

$$\frac{Tf_s\sqrt{\left(\frac{l}{z}\right)^2+\left(\frac{l}{t_w b}\right)^2}}{\sigma_t(R-l)} \leq N \leq \frac{\pi R}{b}$$

As used herein, T refers to a maximum braking torque, $f_s$ refers to a safety coefficient, l refers to a vertical distance from the internal surface of the friction part to a load applied point, z refers to an area inertia moment, $t_w$ refers to a thickness of the bridge, b refers to a width of the bridge, $\sigma_t$ refers to yield strength under material and driving conditions, and R refers to a distance from the center coupling hole to the internal surface of the friction part.

In certain exemplary embodiments, the bridge may be formed in a symmetric structure along the circumference on the coupling hole. In particular embodiment, when b is about 3.55 mm, T is about 220 kgm, R is about 94 mm, l is about 3 mm, b is about 10 mm, $t_w$ is about 6.3 mm, $f_s$ is about 1.25, $\sigma_t$ is about 4.5 kgf/mm², and F is about 69.73 kgf, the number of bridges N may be 35 to 84.

In another aspect, the present invention provides a method of manufacturing a brake disc made of heterogeneous materials.

In an exemplary embodiment, the method may include steps of: a step of casting a gray cast iron friction part, in which the number of bridges N is determined by an Equation below and the bridges are formed, and then pre-heating the friction part; a mounting step of inserting the pre-heated friction part in a lower part of a mold; a casting step of coupling an upper part of the mold to the lower part of the mold, and injecting a molten aluminum alloy, which is a raw material of a hat part; and a completion step of releasing and post-processing after the molten aluminum alloy is solidified.

$$\frac{Tf_s\sqrt{\left(\frac{l}{z}\right)^2+\left(\frac{l}{t_w b}\right)^2}}{\sigma_t(R-l)} \leq N \leq \frac{\pi R}{b}$$

As used herein, T refers to a maximum braking torque, $f_s$ refers to a safety coefficient, l refers to a vertical distance from the internal surface of the friction part to a load applied point, z refers to an area inertia moment, $t_w$ refers to a thickness of the bridge, b refers to a width of the bridge, $\sigma_t$ refers to yield strength under material and driving conditions, and R refers to a distance from the center coupling hole to the internal surface of the friction part.

In certain exemplary embodiments, the method may further include a pre-treating step of sand blast processing to the casted friction part with sand particles having granularity in a size of about 30 to 100 μm, before the pre-heating operation, to improve castability. The pre-heating operation may be performed at a temperature of 250° C. to 400° C. for about 1 to 3 hours.

In certain exemplary embodiments, the friction part may be sand blast processed by bringing a ring shaped reinforcement member having a thickness of about 3 to 10 mm into contact with one surface of the bridge of the friction part, to prevent the bridge from being damaged. In yet certain exemplary embodiments, the casting step may be performed by, but not limited to, a gravity casting method, a molten metal forging method, a low pressure casting method, or a high pressure die casting method.

According to various exemplary embodiments of the present invention, the optimized number of bridges N of the brake disc manufacture from the heterogeneous materials may be provided to improve castability and relieve stress. Accordingly, a crack which may occur in a brake disc in the related art under a severe condition, such as a highly elevated temperature may be prevented.

In another aspect, an improved method of filling molten metal between the bridges during the casting process is provided according to an increase in the number of bridges N, particularly for preventing the bridge from being damaged during a sand removal process.

Parts may be suitably considered formed of heterogeneous or different or distinct materials e.g. if a first part is composed of at least 10 weight % (based on total weight of the first part) of a material that is not present in a second part, or where a first part is composed of at least 20, 30, 40, 50, 60, 70, 80, 90 or 95 weight % (based on total weight of the first part) of a material that is not present in a second part.

Other aspect of the present invention may be disclosed infra.

BRIEF DESCRIPTION OF THE DRAWINGS

The above and other objects, features and advantages of the present invention will be more clearly understood from the following detailed description taken in conjunction with the accompanying drawing, in which.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

Hereinafter, a brake disc manufactured from heterogeneous or distinct or different materials according to various exemplary embodiments of the present invention and a method of manufacturing the brake disc will be described with reference to the accompanying drawings.

In the related art, when a brake disc manufactured in a single material, such as cast iron, and all of a friction part which is in contact with a pad to generate braking force and a hat part coupled to one surface of the friction part are made of a gray cast iron material, the weight of one brake disc may substantially increase to about 6 to 8 kg, thereby degrading fuel efficiency and riding comfort.

Accordingly, a brake disc has been developed in the related art by manufacturing in heterogeneous materials, and the total weight of the brake disc has decreased by using an aluminum material having a less specific gravity than that of a cast iron material for the hat part.

Figure 2:
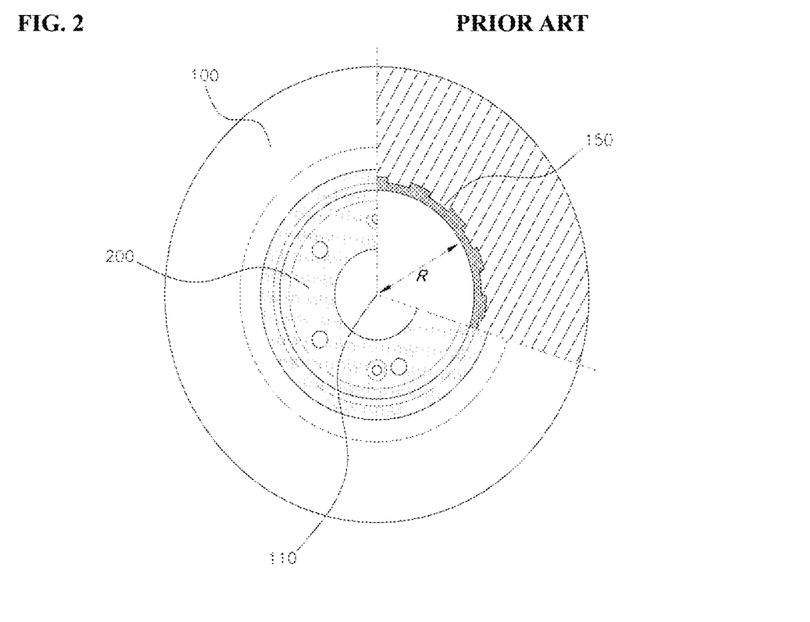
FIG. 2 is a perspective view of a conventional brake disc made of heterogeneous materials in the related art, and illustrates a top view with an opened partial configuration to show a coupling structure of a bridge.

FIG. 2 is a perspective view of a conventional brake disc manufactured from heterogeneous materials in the related art, and illustrates an opened partial configuration to show a bridge coupled in the brake disc structure.

As illustrated in FIG. 2, the brake disc made of heterogeneous materials includes a friction part (100), which has a coupling hole (110) positioned at the center thereof, is shaped like a disc, is made of a cast iron material, and is in contact with a pad to generate braking force. The brake disc also includes a hat part (200), which is coupled to one surface of the friction part (100) made of the cast iron material, is made of an aluminum material. The friction part (100) includes a plurality of bridges (150) having a predetermined interval form on an internal surface of the friction part (100) in a direction toward the coupling hole (110), and having a protruding shape.

In some examples of the related art, the brake disc including 12 bridges has been applied. However, as mentioned above, a crack may occur at a bonded portion of the friction part (100) and the hat part (200) due to a difference in a thermal expansion coefficient between the heterogeneous materials under a severe condition, and thus the brake disc may be damaged. Accordingly, a change in a structure of the bonded portion of the friction part (100) and the hat part (200) or application of a new structure has been continuously attempted.

Now, we provide technical solution to solve the technical difficulties, such as generation of cracks, by adjusting the number of bridges N in a structure of a brake disc manufactured from heterogeneous materials. Thus, the present invention provides an optimum range or number of bridges N by determining castability in a cast bonding process and the like and construing stress applied to the bridge.

In the related, cracks may occur in the bridge or the friction part (100) under a high temperature severe condition due to a difference in a thermal expansion coefficient between the friction part (100) made of the cast iron material and the hat part (200) made of the aluminum material. Accordingly, in the present invention, by adjusting the number of bridges N, durability of the brake disc may be maintained although a highly elevated temperature condition is implemented.

Figure 3:
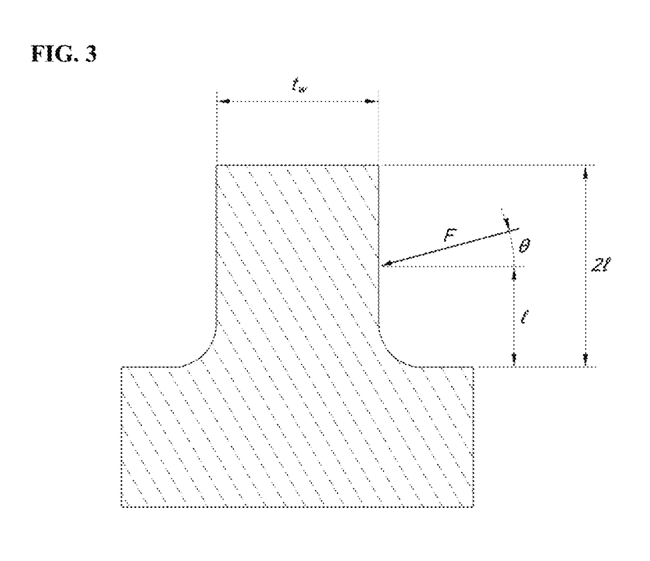
FIG. 3 is a perspective view a bridge in an exemplary brake disc according to an exemplary embodiment of the present invention.

FIG. 3 is a perspective view illustrating one bridge in an exemplary brake disc, to which an experimental stress is applied during braking at an elevated temperature of about 800° C. in the friction part. Each indicated symbol is described as below.

F=Load applied to a unit bridge
θ=Angle at which a load is applied
$t_w$=Thickness of the bridge
B=Width of the bridge
l=Vertical distance from an internal surface of the friction part to a load applied point
$f_s$=Safety coefficient
$\sigma_t$=Yield strength under material and driving condition Herein, Z refers to an Area inertia moment and is determined as follows:

$$Z = \frac{bt_w^2}{6}$$

Herein, $\sigma_b$ refers to bending stress and is determined as follows:

$$\sigma_b = \frac{F\cos\Theta l}{z}$$

Herein, $\sigma_d$ refers to compression stress and is determined as follows:

$$\sigma_d = \frac{F\sin\Theta}{t_w b}$$

Herein, τ refers to shear stress and is determined as follows:

$$\tau = \frac{F\cos\Theta}{t_w b}$$

Herein, $\sigma_v$ refers to equivalent stress and is determined as follows:

$$\sigma_v = \sqrt{(\sigma_b - \sigma_d)^2 + \tau^2}$$

Herein, $\sigma_t$ refers to crack generation prevention condition and is determined as follows:

$$\sigma_t > = f_s \sigma_v$$

In addition, in order to secure castability of gray cast iron and aluminum, a length of a width b of the bridge may also be significant. The number N which refers to a number of maximally implementable bridges may be determined by Equation 1 below, when a radius of a bridge recess, that is a distance from the center coupling hole to the internal surface of the friction part, is R.

$$N = \frac{\pi R}{b} \qquad \text{[Equation 1]}$$

When a load applied to each bridge during the braking is F, an Equation below may be obtained.

$$F = \frac{T}{N(R-l)}$$

Herein, T refers to a maximum braking torque. And N may be obtained as below:

$$N = \frac{T}{F(R-l)}$$

As such, an equivalent stress F will be organized below.

$$F = \frac{\sigma_v}{\sqrt{\left(\frac{\cos\theta l}{z}\right)^2 + \left(\frac{\cos\theta}{t_w b}\right)^2}}$$

When the load F is applied in a direction of a circumferential tangential line, so that when θ=1 is applied, and the load F may be obtained as an Equation below.

$$F = \frac{\sigma_t}{f_s \sqrt{\left(\frac{l}{z}\right)^2 + \left(\frac{l}{t_w b}\right)^2}}$$

In this case, N may be obtained as of T/{F(R−1)}, so that the number N of minimally demanded bridges is presented by Equation 2 below.

$$\frac{T f_s \sqrt{\left(\frac{l}{z}\right)^2 + \left(\frac{l}{t_w b}\right)^2}}{\sigma_t (R-l)} \quad \text{[Equation 2]}$$

Accordingly, the present invention suggests the range of the number N of bridges represented according to an Equation below by Equations 1 and 2 to improve castability and relieve stress.

$$\frac{T f_s \sqrt{\left(\frac{l}{z}\right)^2 + \left(\frac{l}{t_w b}\right)^2}}{\sigma_t (R-l)} \leq N \leq \frac{\pi R}{b}$$

As used herein, T refers to a maximum braking torque, $f_s$ refers to a safety coefficient, l refers to a vertical distance from the internal surface of the friction part to a load applied point, z refers to an area inertia moment, $t_w$ refers to a thickness of the bridge, b refers to a width of the bridge, $\sigma_t$ refers to yield strength under material and driving conditions, and R refers to a distance from the center coupling hole to the internal surface of the friction part.

Hereinafter, the present invention will be described in more detail through an exemplary embodiment. These exemplary embodiments are only for illustrating the present invention, and it will be obvious to those skilled in the art that the scope of the present invention is not interpreted to be limited by these exemplary embodiments.

In general, in order to improve castability of FC and aluminum, a thickness and a width of the bridge may be required to have a minimum value of about 3.5 mm. Accordingly, when a radius of the bridge recess (a distance from the center coupling hole to the internal surface of the friction part) is about 94 mm, the number N of maximally implementable bridges may be obtained by Equation 1 below.

$$N = \pi 94/3.5 = 84.3$$

Accordingly, the maximum number of bridges N considering castability may be about 84.

In certain exemplary embodiments, when T is about 220 kgm, R is about 94 mm, l is about 3 mm, b is about 10 mm, $t_w$ is about 6.3 mm, $f_s$ is about 1.25, yield strength of the FC material at about 800° C. is about 4.5 kgf/mm² (45 MPa), and F is about 69.73 kgf which may be an endurable load per bridge at about 800° C.), the number N of minimally demanded bridges may be obtained as about 34.77 by Equation 2.

Since the range of the number of bridges N may be obtained to be 35 to 84 from the result, the brake disc with 48 bridges which are formed in a symmetric structure along the circumference of the coupling hole was manufactured. After an evaluation of braking performance at the elevated temperature, generation of cracks was not observed.

A severe braking mode at the elevated temperature to about 800° C. will be described in Table 1 below.

TABLE 1

| Classification | Braking speed | Deceleration speed | Number of times | Braking interval | Wind speed |
|---|---|---|---|---|---|
| Snub | 200−>79 kph | 0.5 g | 9 | 30 sec | 11 m/s |
| Stop | 200−>0 kph | 1 g | 1 | | |

In Table 1, the term "Snub" refers to deceleration and the term "Stop" refers to a stop.

Figure 4:
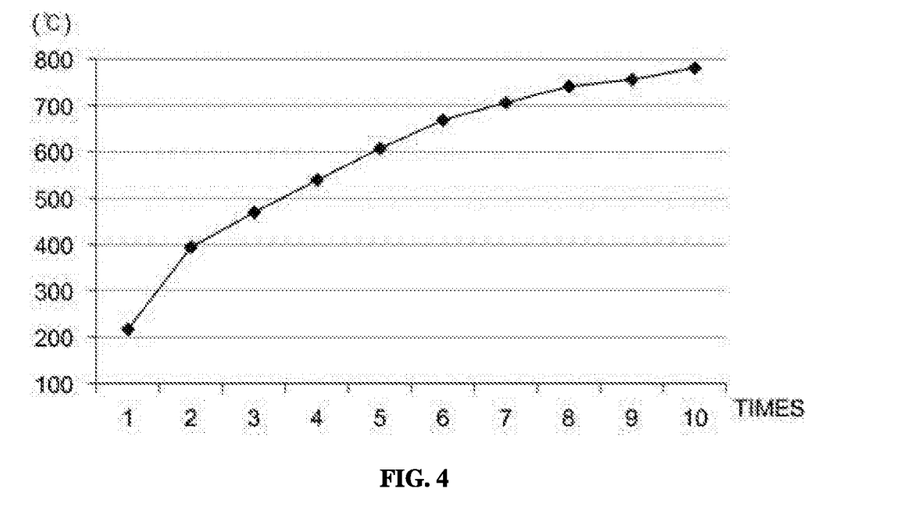
FIG. 4 is a graph illustrating an exemplary temperature profile during braking from the first time to the tenth time according to Table 1 in an exemplary embodiment of the present invention.

Braking is continuously performed nine times at an interval of about 30 sec with a high deceleration speed of about 0.5 g from a high speed of about 200 kph, and then rapid braking is performed at the last tenth braking with a ultra-high deceleration speed of about 1.0 g in a stop state from a speed of about 200 kph to stop. A temperature profile during the braking from first time to tenth time is illustrated in FIG. 4.

Figure 5A:
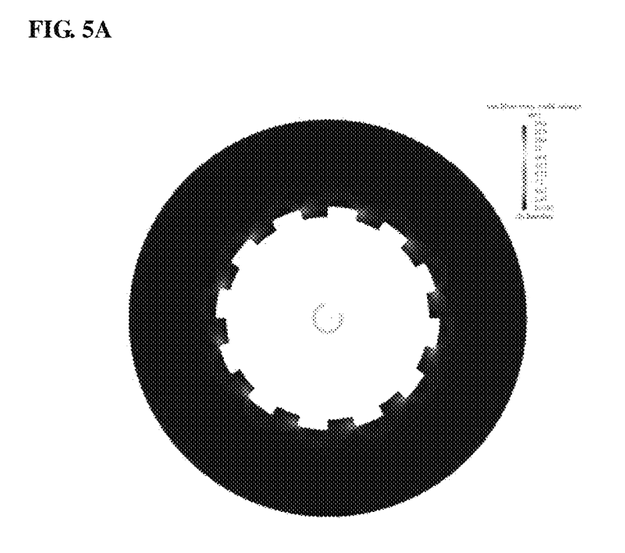
FIGS. 5A and 5B are diagrams illustrating stress interpretation results of rapid braking when a friction surface of an exemplary brake disc including 12 bridges has an elevated surface temperature of about 800° C. according to a Comparative Example in the present invention.
Figure 5B:
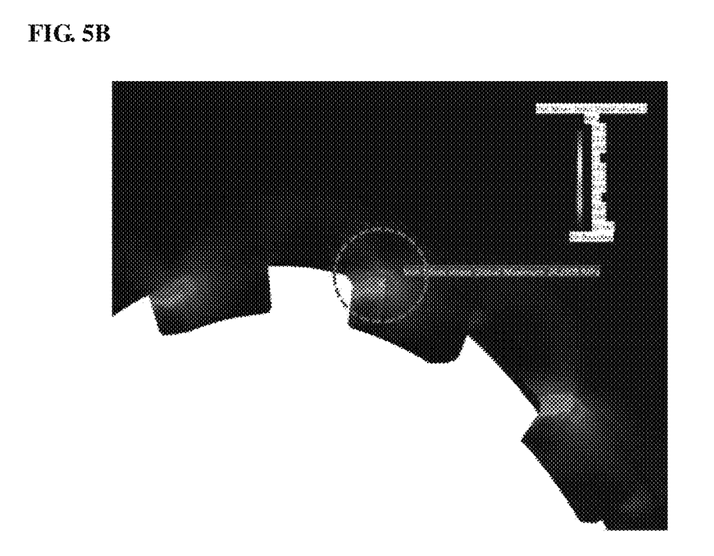
Figure 6A:
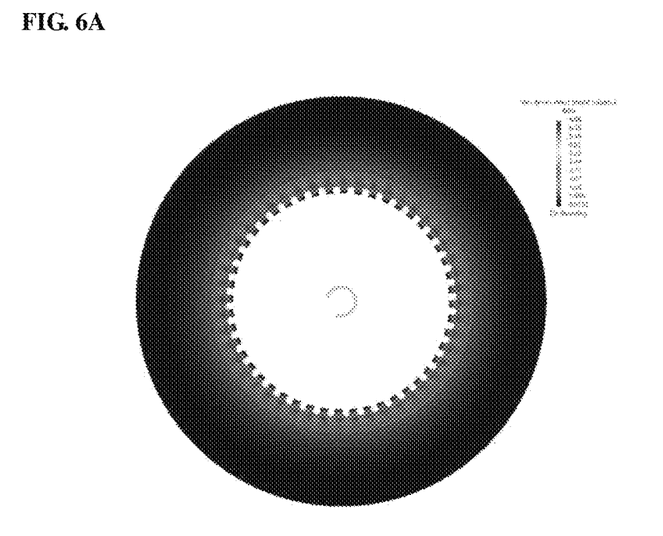
FIGS. 6A and 6B are diagrams illustrating stress interpretation results of rapid braking when a friction surface of an exemplary brake disc including 48 bridges has an elevated temperature of about 800° C. according to an exemplary embodiment of the present invention.
Figure 6B:
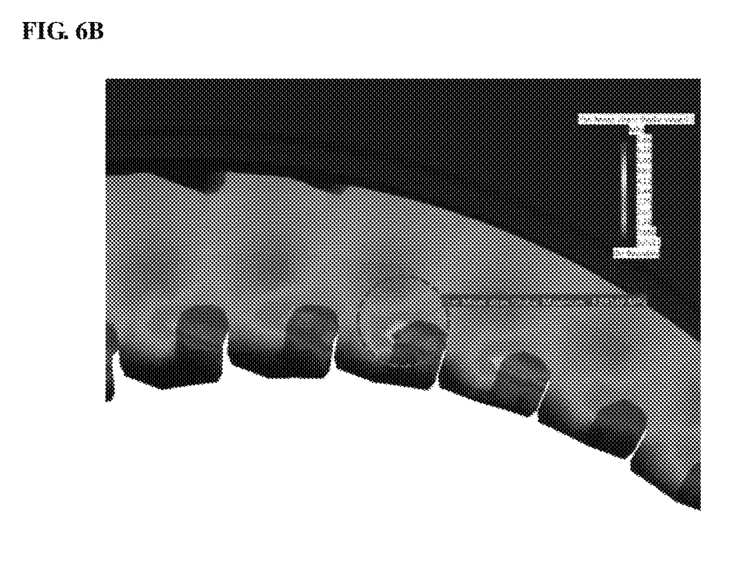

FIGS. 5A and 5B are diagrams illustrating stress interpretation results of rapid braking when a friction surface of a disc including 12 bridges has a high temperature (800° C.) according to a Comparative Example, and FIGS. 6A and 6B are diagrams illustrating stress interpretation results of rapid braking when a friction surface of an exemplary brake disc including 48 bridges has a high temperature (800° C.) according to an exemplary embodiment of the present invention.

As illustrated in the drawings, in the brake disc when the number of bridge N is 12 in the related art, maximum stress of about 24.3 MPa was applied to one bridge. However, when the brake disc was manufactured with 48 bridges according to the exemplary embodiment of the present invention, maximum stress applied to one bridge was about 6.86 MPa, so that it can be seen that stress applied to the bridge has significantly decreased.

In another aspect, the method of manufacturing the brake disc of the present invention may be a typical cast bonding process and the like without limitation, but the number of bridges N may be greater than that of a general disc in the related art according to exemplary embodiments of the present invention.

In the step of casting a gray cast iron friction part, a friction part made of a gray cast iron material, in which the number N of bridges satisfies an Equation below, may be casted.

$$\frac{Tf_s\sqrt{\left(\frac{l}{z}\right)^2+\left(\frac{l}{t_w b}\right)^2}}{\sigma_t(R-l)} \leq N \leq \frac{\pi R}{b}$$

As used herein, T refers to a maximum braking torque, $f_s$ refers to a safety coefficient, l refers to a vertical distance from the internal surface of the friction part to a load applied point, z refers to an area inertia moment, $t_w$ refers to a thickness of the bridge, b refers to a width of the bridge, $\sigma_t$ refers to yield strength under material and driving conditions, and R refers to a distance from the center coupling hole to the internal surface of the friction part.

In certain exemplary embodiments, before the pre-heating step, foreign materials may be removed by performing pre-processing, such as sand blast processing, particularly utilizing sand particles of granularity in a size of about 30 to 100 μm on the friction part. Further, in particular, the friction part may be processed so that surface roughness thereof is in a range of about 6.3 to 25 Ra, and as used herein, the unit Ra of roughness refers to an arithmetical mean roughness defined in ISO 4287:1997. Since the friction part has friction force within such range of roughness, the friction part and the hat part may suitably slip from each other while having friction force by the casting. When the roughness is greater than the predetermined range, particularly greater than 25 Ra, the friction part and the hat part may not slip, so that stress may be rather concentrated. When the roughness is less than the predetermined range, particularly less than about 6.3 Ra, bonding force between the friction part and the hat part may decrease even though a chamfer may be formed.

Figure 7A:
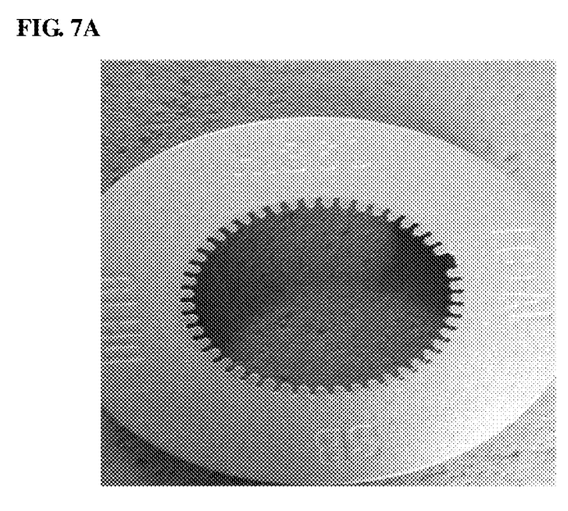
FIGS. 7A and 7B are photographic views showing an exemplary broken bridge of an exemplary brake disc including the increased number of bridges N according to an exemplary embodiment of the present invention.
Figure 7B:
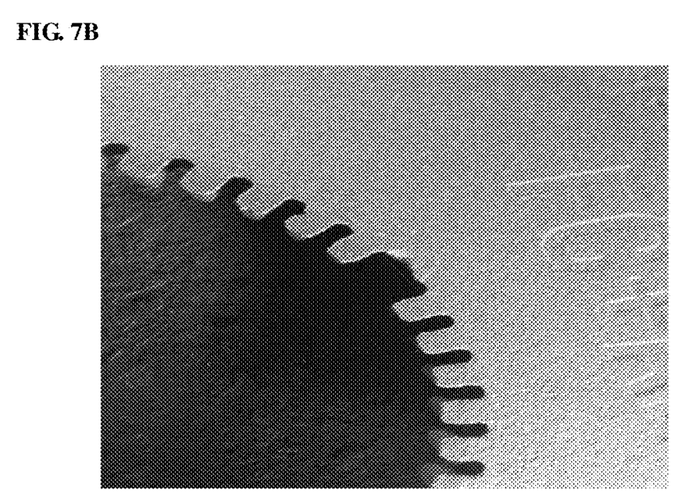

Since the number of bridges N of the friction part according to the present invention increases compared to that of the friction part in the related art, as illustrated in FIG. 7A and FIG. 7B, particularly in enlarged FIG. 7A, the bridge part may be damaged during a sand removal process (a process of removing sand) after the casting.

Figure 8A:
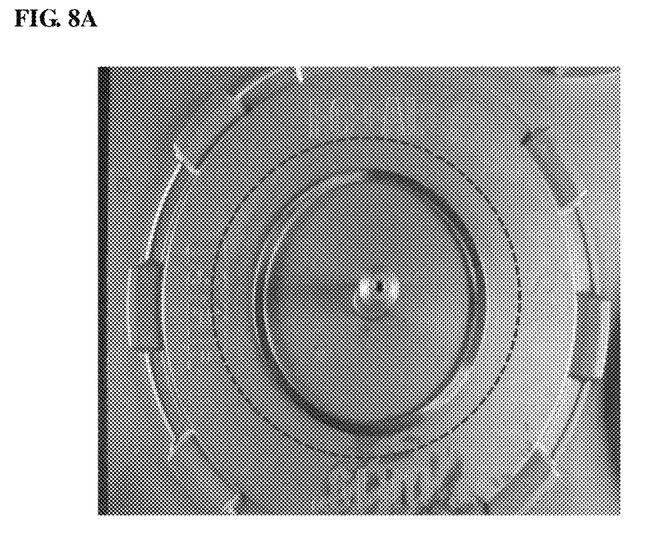
FIGS. 8A and 8B are photographic views showing an exemplary ring-shaped reinforcement member is installed on one surface of the bridge in an exemplary brake disc according to an exemplary embodiment of the present invention.
Figure 8B:
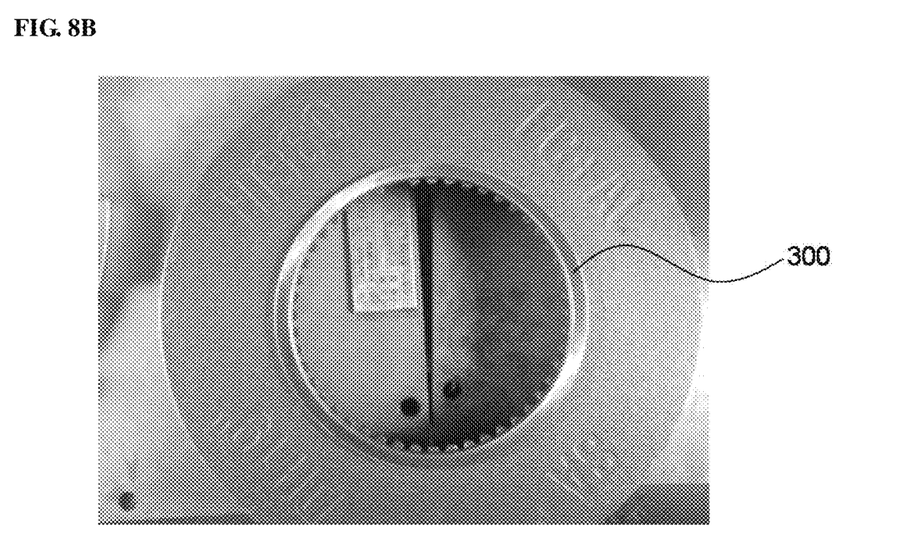

Accordingly, to prevent the damage of the bridge part, as illustrated in FIGS. 8A and 8B, a ring shaped reinforcement member (300) having a thickness of about 3 mm or greater, or particularly in a range of about 3 to 10 mm, may be brought into contact with one surface of the bridge of the friction part during sand blast processing, thereby preventing the bridge from being damaged.

In certain exemplary embodiments, moisture and stress of the friction part made of gray cast iron may be removed by performing pre-heating, and the pre-heating may be performed at a temperature of about 250° C. to 400° C. for about 1 to 3 hours. Accordingly, the molten aluminum alloy may be substantially fillable even though the number of bridges N increases, thereby improving molten metal fillability.

Subsequently, the friction part may be inserted into a lower part of a mold, an upper part of the mold may be coupled to the lower part of the mold, and then a molten aluminum alloy, that is a raw material of a hat part, may be injected into the mold to perform casting. The casting step may be, but not limited to, a gravity casting method, a molten metal forging method, a low pressure casting method, a high pressure die casting method, or the like. The molten aluminum alloy, which is the raw material of the hat part, may be heated at a temperature of about 650 to 750° C. and then injected.

After the molten aluminum alloy is solidified, releasing and post-processing may be performed to complete the brake disc manufactured from the heterogeneous materials.

Figure 9:
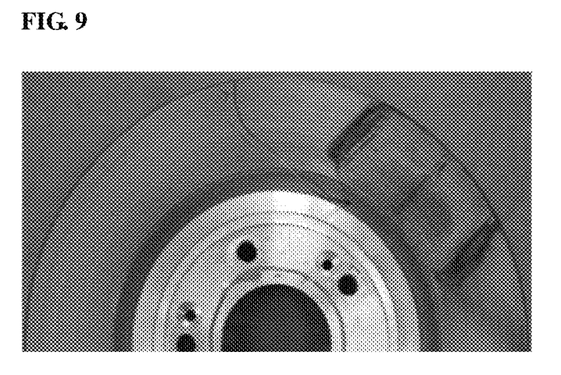
FIG. 9 is a photographic view showing a test result of a brake disc made of heterogeneous materials according to an exemplary embodiment of the present invention after an experiment under a severe condition.

FIGS. 1 and 9 show photographic views of test results from a high temperature severe condition of a brake disc manufactured from heterogeneous materials in the related art and an exemplary brake disc having a number of bridge N of 48 EA manufactured from heterogeneous materials according to an exemplary embodiment of the present invention.

Particularly, when the brake disc is exposed to a high temperature and high speed braking condition, the temperature of the friction surface may increase to about 800° C. As shown in FIG. 1, a crack is generated in the brake disc in the related art. In contrast, according to various exemplary embodiments of the present invention, such stress may be relieved by the increased number of bridges N, and thus a crack may not occur in the brake disc.

As described above, although the present invention has been described by various exemplary embodiments and drawings, the present invention is not limited to the embodiments, and it will be apparent to those skilled in the art to which the present invention pertains that various modifications and variations may be made from the description. Accordingly, the spirit of the present invention shall be recognized by the accompanying claims, and all of uniform or equivalent modifications thereof belong to the scope of the spirit of the present invention.

What is claimed is:

1. A method of manufacturing a brake disc comprising heterogeneous or different materials, comprising steps of:
    a step of casting a gray cast iron friction part, in which N is a number of bridges formed from an internal surface of the friction part toward a center coupling hole and is determined by an Equation below;

$$\frac{Tf_s\sqrt{\left(\frac{l}{z}\right)^2+\left(\frac{l}{t_w b}\right)^2}}{\sigma_t(R-l)} \leq N \leq \frac{\pi R}{b}$$

a step of pre heating the friction part;
    a mounting step of inserting the pre-heated friction part in a lower part of a mold;
    a casting step of coupling an upper part of the mold to the lower part of the mold, and injecting a molten aluminum alloy which is a raw material of a hat part; and
    a completion step of releasing and post-processing after the molten aluminum alloy is coagulated or solidified,
    wherein T is a maximum braking torque, $f_s$ is a safety coefficient, l is a vertical distance from the internal surface of the friction part to a load applied point, z is an area inertia moment, $t_w$ is a thickness of the bridge, b is a width of the bridge, $\sigma_t$ is yield strength under material and driving conditions, and R is a distance from a center coupling hole to the internal surface of the friction part.

2. The method of claim 1, further comprising:
    a pre-processing step of sand blast processing to the casted friction part with sand particles having granularity of a size of about 30 to 100 μm before the pre-heating step.

3. The method of claim 2, wherein in the pre-processing step of sand blast processing to the casted friction part, a ring shaped reinforcement member having a thickness of about 3 to 10 mm is in contact with one surface of a bridge of the friction part.

4. The method of claim 1, wherein the pre-heating step is performed at a temperature of about 250° C. to 400° C. for about 1 to 3 hours.

5. The method of claim 1, wherein the step of casting is performed by a gravity casting method, a molten metal forging method, a low pressure casting method, or a high pressure die casting method.

* * * * *